United States Patent [19]

Corder et al.

[11] Patent Number: 5,583,448
[45] Date of Patent: Dec. 10, 1996

[54] SYSTEM BUS TERMINATION STATUS DETECTION

[75] Inventors: Rodney Corder, Huntington Beach; Davin Stockwell, Irvine; Scott Coleman, Mission Viejo, all of Calif.

[73] Assignee: New Media Corp., Irvine, Calif.

[21] Appl. No.: 339,908

[22] Filed: Nov. 14, 1994

[51] Int. Cl.$^6$ ............................ H03K 19/00; H03K 17/16
[52] U.S. Cl. .................................................. 326/30; 326/16
[58] Field of Search ............................. 326/16,30,86,90; 375/257

[56] References Cited

U.S. PATENT DOCUMENTS

| | | | |
|---|---|---|---|
| 4,748,426 | 5/1988 | Stewart | 326/30 |
| 4,841,232 | 6/1989 | Graham et al. | 326/16 |
| 5,434,516 | 7/1995 | Kosco | 326/30 |
| 5,473,264 | 12/1995 | Mader et al. | 326/30 |

OTHER PUBLICATIONS

Bill Stanley, "Automatic Termination Method 2", Adaptec Corporation Plug and Play SCSI Workshop, Jun. 8, 1994, pp. 5–8.

Primary Examiner—Edward P. Westin
Assistant Examiner—Richard Roseen
Attorney, Agent, or Firm—Gregory Garmong

[57] ABSTRACT

A system has the capability to determine the termination status of a data-communication bus therein. The system includes a source of a bus signal from a bus, a selectively activated current sink that communicates with the source of the bus signal, with a detection activation input, and a source of a detection signal in communication with the detection activation input of the current sink. There is a source of a first reference voltage, and a source of a second reference voltage, the second reference voltage being less than the first reference voltage. A high-termination comparator has an upper voltage input that communicates with the source of the bus signal, a lower voltage input that communicates with the source of the first reference voltage, and a logical high-termination output. A low-termination comparator has a lower voltage input that communicates with the source of the bus signal, an upper voltage input that communicates with the source of the second reference voltage, and a logical low-termination output. The detection circuitry is activated by applying a voltage through the source of the detection signal when the bus is idle and a near-end, local termination of the bus is disconnected, and monitoring the logical high-termination and the logical low-termination outputs.

19 Claims, 3 Drawing Sheets

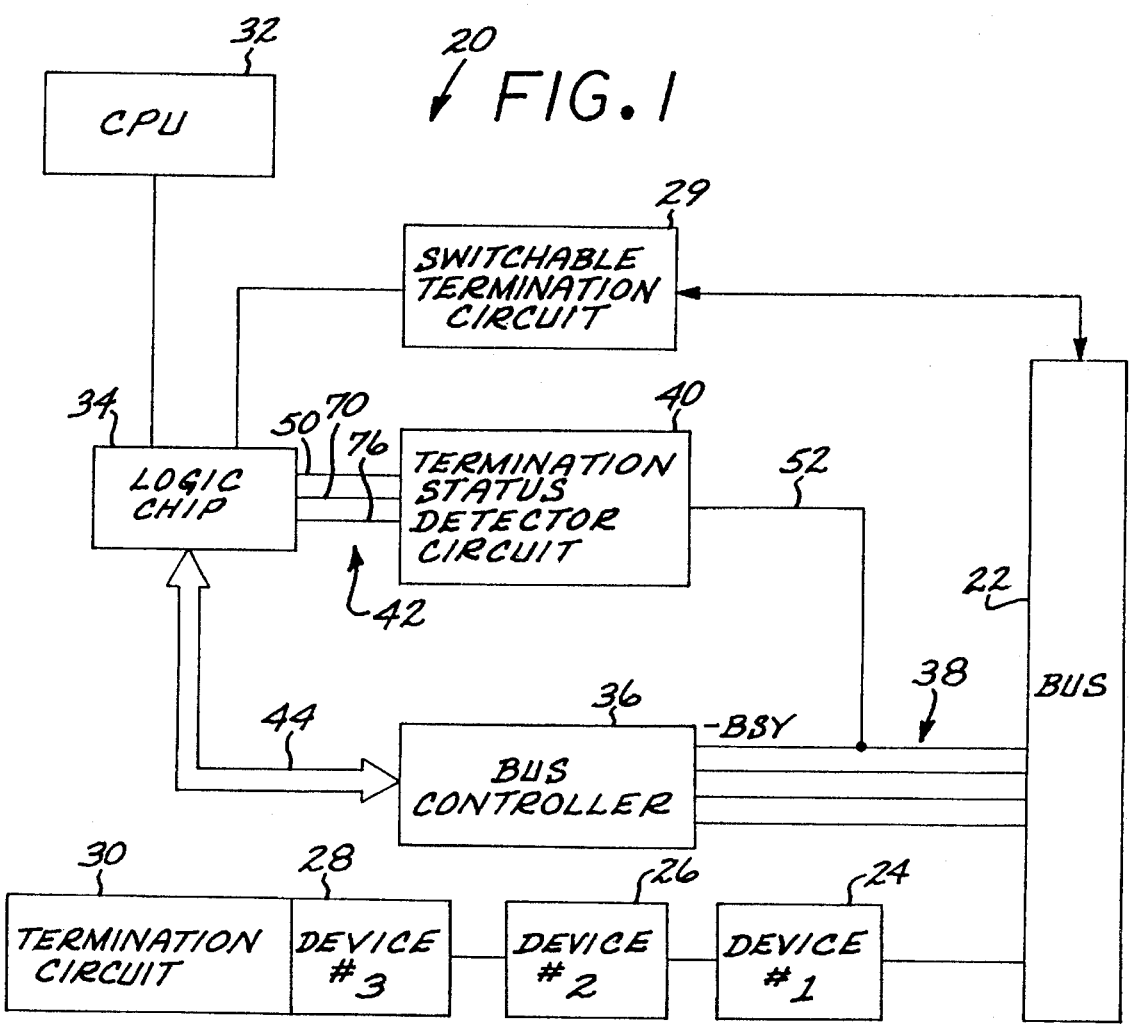
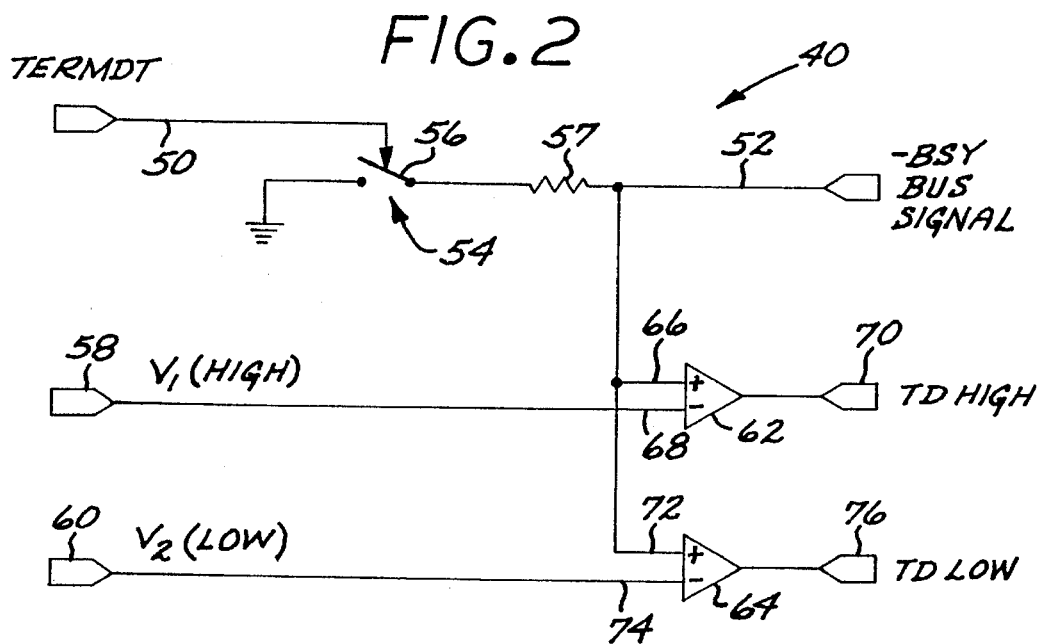

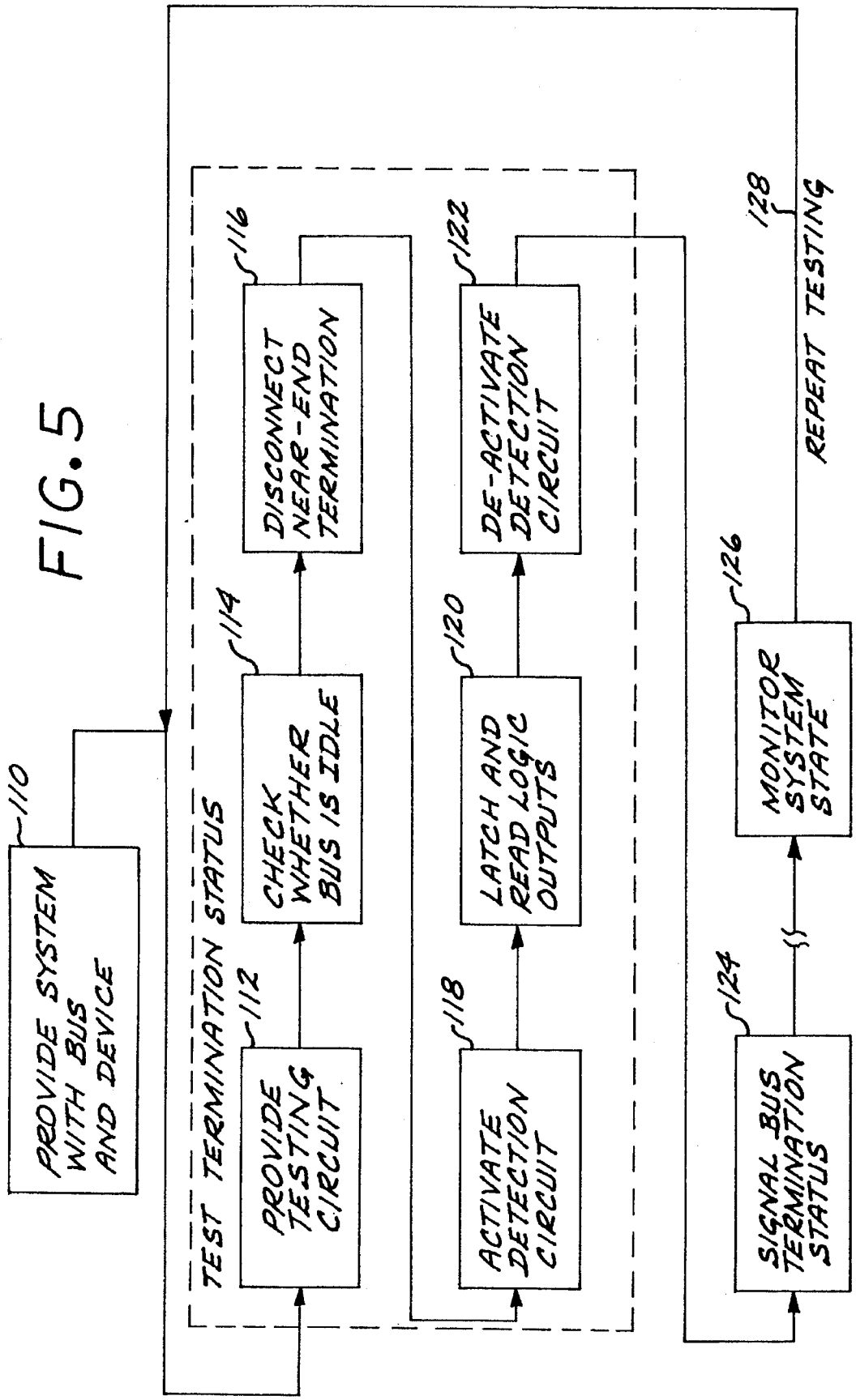

SYSTEM BUS TERMINATION STATUS DETECTION

BACKGROUND OF THE INVENTION

This invention relates to systems having a data bus, and, more particularly, to computer systems having a common bus that must be properly terminated in order for the bus to function correctly.

One well-known computer system architecture includes a common bus that communicates data among the processor of the computer, other portions of the computer, and peripheral devices. The bus style of communication permits information to be shared by many parts of the system, but decoded and used by only those parts requiring it for particular applications. Bus architectures are widely used in desktop, portable, and palmtop small computers employing the small computer systems interface (SCSI) standard.

It is important that the bus be properly terminated. That is, the ends of the bus must present the proper apparent voltage and resistance conditions to signals transmitted on the bus. In the absence of the proper termination, data transfers on the bus may be unreliable and/or slow.

The devices plugged into the bus typically have built-in termination circuitry. These terminations must be correctly configured by the user of the computer system in order to avoid later problems in data transmission on the bus. In some cases, the user does not know how to configure the built-in termination, inadvertently changes the configuration, is not aware that a reconfiguration must be made after system hardware changes, or otherwise fails to achieve the proper termination. The result is an inefficient operation of the bus, which may not be apparent to the computer user or may be apparent only as a persistent "bug". Identifying situations of improper termination can be difficult, particularly for computer users not experienced in solving computer hardware problems.

It has been proposed that the computer itself could test the bus for proper termination and notify the user of the absence of a proper termination. Circuitry for this purpose has been designed. However, the circuitry and procedures suggested to date have shortcomings when used in some applications. Specifically, the termination test circuitry may itself place a significant current drain on the system, which is a serious problem for small, battery-powered computers of the palmtop type. The termination test circuitry may also interfere with the operation of the bus by introducing a series resistance into the bus.

Accordingly, there remains a need for an automated termination test capability for systems using a bus architecture. The present invention fulfills this need, and further provides related advantages.

SUMMARY OF THE INVENTION

The present invention provides termination status detection circuitry and a termination status detection test procedure. The approach of the invention is effective to automatically determine the termination status of a data bus. The detection circuitry does not consume current when the termination status is not being determined, and consumes minimal current when the termination status is being determined. The termination status is readily established whenever new devices are added to the bus or addressed through the bus. The present invention allows the user of the system to be notified of an improper termination. The user must then see to achieving the necessary termination status, as the present approach provides only a warning, not a correction of the problem.

In accordance with the invention, a system having the capability to determine the termination status of a bus therein includes electronic circuitry that permits the monitoring of the bus termination. The system includes a source of a bus signal from a bus, a selectively activated current sink that communicates with the source of the bus signal, the current sink having a detection activation input, and a source of a detection signal in communication with the detection activation input of the current sink. There is a source of a first reference voltage, and a source of a second reference voltage, the second reference voltage being less than the first reference voltage. A high-termination comparator has an upper voltage input that communicates with the source of the bus signal, a lower voltage input that communicates with the source of the first reference voltage, and a logical high-termination output. A low-termination comparator has a lower voltage input that communicates with the source of the bus signal, an upper voltage input that communicates with the source of the second reference voltage, and a logical low-termination output.

In one preferred embodiment, the current sink includes a pull-down resistor having a first end that communicates with the source of a bus signal, and a switch that selectively connects a second end of the pull-down resistor with ground. The switch is conveniently a transistor having a collector in communication with the second end of the pull-down resistor, an emitter communicating with ground, and a base communicating with the source of the detection signal. The sources of the first and second reference voltages are conveniently provided as the outputs of a voltage divider stack of transistors or resistors.

To determine the state of the bus termination, the system, typically a computer, activates the source of the detection signal when the bus is idle, so that there is a voltage on the detection signal line, and the termination on the computer end of the bus is disconnected. The current sink is activated so that the signal on the source of the bus signal is pulled down through the pull-down resistor. At the same time, the voltage divider produces voltages from the detection signal that are used as references by the comparators. The logic outputs of the comparators are latched into the system logic and monitored. If the logic outputs of the comparators remain inactive (low), the bus termination is within the desired limits and is proper. An active output of either comparator signals an out-of-limits condition in the bus termination. This information is communicated to the computer and the user, so that corrective action, if any, can be taken. This procedure is repeated as necessary, and particularly when a new device is addressed on the bus to be certain that it is still properly terminated.

The present approach does not impose a current drain on the bus when the termination status is not being tested, and only a small current drain during testing. There is no series resistance imposed into the bus between the computer and the bus being tested. These features are desirable in all cases, but particularly for small computers operating under the small computer system interface (SCSI) architecture and for battery-operated, portable systems.

The present invention therefore provides an advance in the art of systems that use a bus communication architecture. Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 1 is a block diagram of a computer system using the termination detection status monitor of the invention;

FIG. 2 is a block diagram of a first embodiment of the termination status detection circuitry;

FIG. 5 is a block flow diagram for the method of the invention.

DETAILED DESCRIPTION OF THE PREFERRED EMBODIMENT

Figure 3:
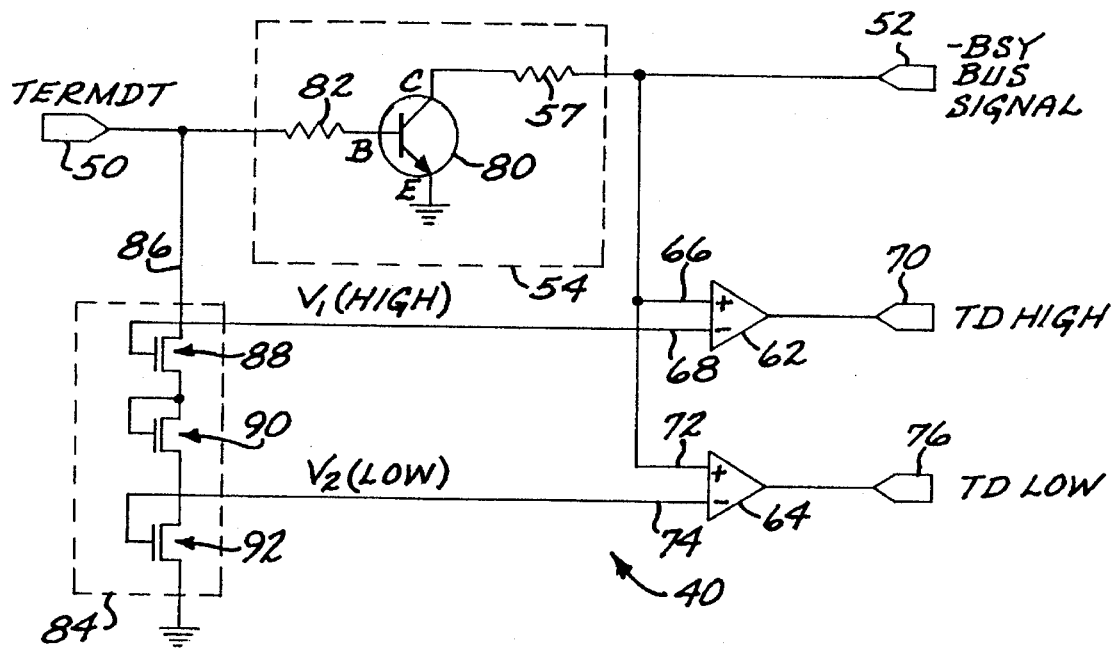
FIG. 3 is a block diagram of a second embodiment of the termination status detection circuitry.

FIG. 1 depicts a system 20 that utilizes a bus 22 to communicate with devices, here depicted as three devices 24, 26, and 28 that are daisy-chained together. One end of the bus 22, the near end closest to the computer, is terminated with a switchable near-end, or local, termination circuit 29 that may be controllably turned on or off. The most remote of the devices 24, 26, and 28 is terminated with a termination circuit 30. In some cases the termination circuit 30 may not be present or may be improperly configured. The present invention is concerned with remotely and automatically detecting whether the termination circuit 30 is present and properly configured, or absent or improperly configured, or whether additional termination is provided by devices 24, 26, or 28. The user of the system 20 is notified of any improper termination status, so that the user can take corrective action.

The system 20 preferably employs a computer, and the bus 22 is preferably a small computer system interface (SCSI) bus. In this preferred system 20, a computer central processing unit (CPU) 32 communicates with a logic chip 34 having a logic register and a latching capability. The bus 22 is driven by a bus controller 36 having a number of input and output lines 38. Such CPUs, logic chips, and bus controllers are well known in the art.

The logic chip 34 communicates with a termination status detection circuit 40, whose structure and operation will be described in more detail in relation to FIG. 2–5. In the preferred embodiment, three communications lines 42 between the logic chip 34 and the circuit 40 are provided. The circuit 40 also communicates with at least one input/output (I/O) line 38 of the bus controller 36. In the illustrated preferred case, the circuit 40 communicates with the -BSY line of the bus controller 36, but other operable lines could be used.

The logic chip 34 communicates with the switchable termination circuit 29 to turn it on (thereby terminating the bus 22 at the near end) or off. The logic chip 34 also communicates with the bus controller 36 through a data path 44.

FIG. 2 depicts one embodiment of the termination state detection circuit 40 in greater detail. A source 50 of a detection signal, also called the TERMDT signal, is provided as one of the three communications lines 42 between the logic chip 34 and the circuit 40. The source 50 of the detection signal is activated by the logic chip 34 under control of the computer CPU 32 when the termination state of the bus 22 is to be determined.

A source 52 of a bus signal from the bus 22 is also provided in the circuit 40. The source 52 of a bus signal is a signal that can be monitored when the bus 22 is idle. In the case of a standard SCSI bus, it is preferred to use the -BSY line available from the bus controller 36. Other lines such as the -RESET line can also be used. The -BSY line is preferred, because it can become active when the bus is idle and because it causes no activity on the part of the devices 24, 26, and 28 or the controller 36. When the RESET line is used as the source 56, resetting of the devices 24, 26, and 28 occurs, the devices lose their previous state, and there may be a short delay for the devices to recover and become active again.

The circuit 40 includes a selectively activated current sink 54, through which the source 52 can be grounded. The current sink 54 as depicted in FIG. 2 includes a switch 56 that communicates on one side with the source 52 of the bus signal, and, when closed, connects the bus signal to ground. The switch 56 is operated by the source 50 of the detect signal. That is, the circuit 40 is activated to check the bus termination status by operating the source 50 of the detection signal to close the switch 56, thereby grounding the source 52 of the bus signal through a pull-down resistor 57.

There are a source 58 of a first reference voltage $V_1$ and a source 60 of a second reference voltage $V_2$. The second reference voltage is less than the first reference voltage. The use of the reference voltages is discussed subsequently. Any operable source can be used, although subsequently discussed embodiments will present voltage sources that are particularly suitable for use in microcomputer applications.

A pair of comparators 62 and 64 are provided to compare the voltage on the source 52 with the reference voltages $V_1$ and $V_2$. The high-termination comparator 62 has an upper voltage input 66 that communicates with the source 52 of the bus signal. The high-termination comparator 62 has a lower voltage input 68 that communicates with the source 58 of the first reference voltage. A logical high-termination output signal 70 is one of the three communications lines 42.

The low-termination comparator 64 has a lower voltage input 72 that communicates with the source 52 of the bus signal. The low-termination comparator 64 has an upper voltage input 74 that communicates with the source 60 of the second reference voltage. A logical low-termination output signal 76 is one of the three communications lines 42.

Figure 4:
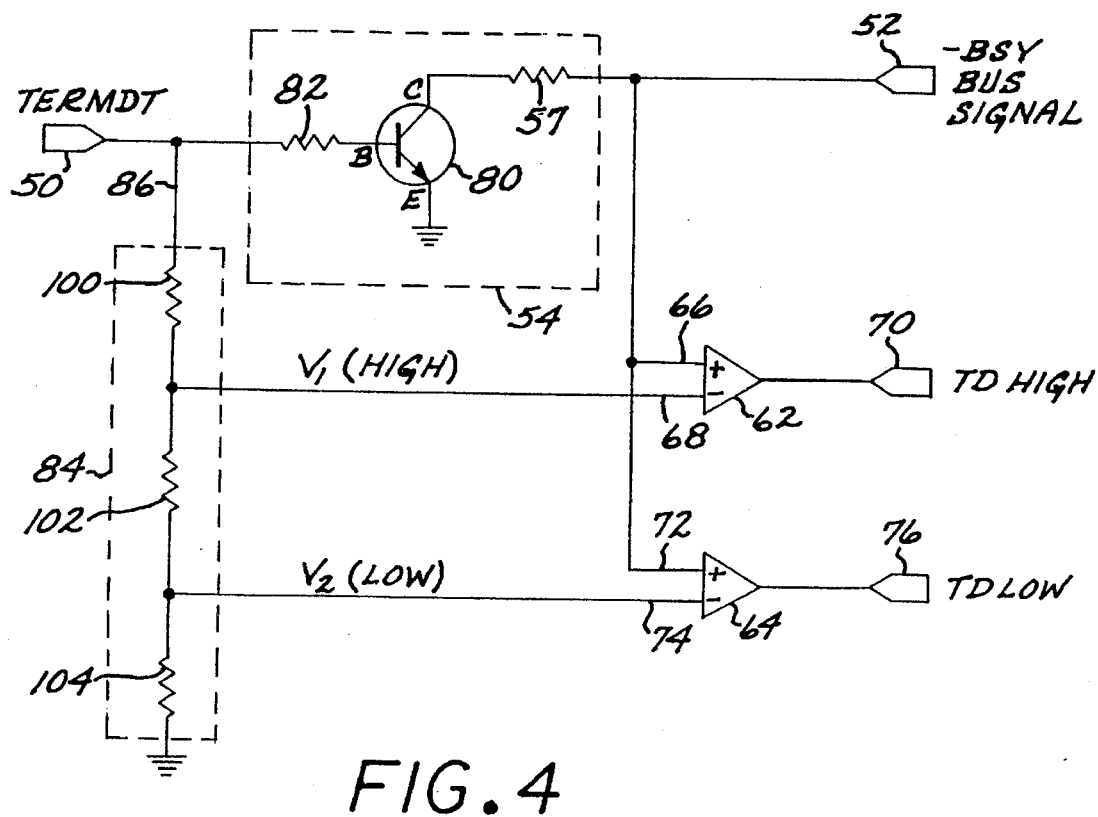
FIG. 4 is a block diagram of a third embodiment of the termination status detection circuitry.

FIGS. 3 and 4 depict two embodiments of the termination state detection circuit 40 as it is implemented for fabrication on a chip and used in a microcomputer application. In these figures, components comparable to those discussed in relation to FIG. 2 are given the same numerals, and the description of their structure and function are incorporated from the discussion related to FIG. 2.

Referring to FIG. 3, the current sink 54 includes a transistor 80 having a base B, a collector C, and an emitter E. The source 52 of the bus signal communicates with the collector C, through the pull-down resistor 57. The emitter E is grounded. The source 50 of a detection signal communicates with the base B of the transistor 80 through a base resistor 82. The base resistor 82 acts as a current-limiting resistor for the base B when the source 50 is active. The transistor 80 serves in the same manner as the switch 56 of FIG. 2, so that activation of the source 50 of the detection signal closes the path from the collector C to the emitter E, thereby grounding the source 52 of the bus signal.

The voltage sources 58 and 60 are provided as outputs of a voltage divider stack 84. In input 86 to the voltage divider stack 84 is the voltage of the source 50 of the detection signal. The other end of the voltage divider stack is grounded. The voltage divider stack 84 is formed of three transistors, in this case three field effect transistors (FETs) 88, 90, and 92. The FETs are selected to yield the desired voltages $V_1$ and $V_2$. In a preferred case wherein $V_1$ is 2.4 volts and $V_2$ is 0.8 volts, the FETs are chosen with $V_{th}$ of 0.8 volts.

In another embodiment, FIG. 4, a resistive voltage divider is used as the voltage divider 84. The resistive voltage divider 84 includes an upper resistor 100, a middle resistor 102, and a lower resistor 104 stacked in series arrangement. Taps between the respective pairs of resistors 100/102 and 102/104, together with the selection of the resistances of the resistors, permit selected voltages to be sampled. The exact values depend upon the characteristics of the bus and its desired termination state.

The resistances of the resistors 82, 100, 102, and 104 are selected so that the load to ground of the source 50 of the detection signal, when active, is at least 2500 ohms (for a detection signal 50 of about 5 volts). More preferably, the load is about 10,000 ohms. Lower loads lead to excessive current flow from the source 50, a drop in the voltage of the source 50, and consequent difficulty in making the termination measurements to be described subsequently.

FIG. 5 depicts the sequence of events that occur when the method of the invention is practiced. The method will be discussed in relation to its specific application to a SCSI bus used in a hand-held computer, by way of illustration of the analytical approach. The apparatus and method are not so limited, however, and may be applied more generally to other systems and bus types.

A system having a bus and at least one device connected to the bus is provided, numeral 110. The system is typically a computer system such as the system 20 illustrated in FIG. 1.

The monitoring and detection circuit 40 is provided for use in the testing of the termination status, numeral 112, of the system 20, as shown in FIG. 1 and for the preferred embodiments of the detection circuit 40 in FIGS. 3-4. The termination status of the bus is tested upon command, according to criteria to be discussed subsequently. This testing is accomplished automatically, without human input or intervention except to select the testing criterion and possibly to create the situation which requires the testing. When the termination status at the far end of the bus 22 (i.e., termination circuit 30) is to be tested, the bus -BSY signal (or other appropriate signal) is checked to determine whether the bus 22 is idle, numeral 114. If so, the logic chip 34 disconnects the near-end termination of the bus 22 using the switchable termination circuit 29, numeral 116.

Upon command from the computer CPU 32, the source 50 of the detection signal is activated, numeral 118, in order to determine the termination status of the bus 22 and the devices 24, 26, and 28. In the preferred case of a SCSI bus 22, the detection signal is at about 5 volts. When the source 50 is activated, the current-limiting base resistor 82 permits a small current to flow to the base B of the transistor 80 to turn on the transistor. (When the resistors 54, 100, 102, and 104 of FIG. 4, or the equivalent resistance of the resistor 54 and transistors 88, 90, and 92 of FIG. 3, together present a 10,000 ohm load, the total current through the source 50 is about 0.5 milliamperes, which is a negligible current drain on the output driver of the source 50.)

The grounded emitter E of the transistor attempts to pull the source 52 of the bus signal low through the pull-down resistor 57. A proper termination circuit 30 for a SCSI will respond as a Thevinin equivalent element having a resistance of about 132 ohms in series with a 2.85 volt power supply. Thus, if the source 52 is properly terminated, voltage on the source 52 of the bus signal will be pulled down to approximately $$V_{cesat} + [(V_{term} - V_{cesat})(R57)]/(R57 + R_{term})$$

or about 1.5 volts. In this computation, $V_{cesat}$ is the collector-to-emitter saturation voltage of the transistor 80, which is typically about 0.3 volts, $V_{term}$ is the Thevinin equivalent termination voltage of about 2.85 volts, $R_{term}$ is the Thevinin equivalent termination resistance of about 132 ohms, and R57 is the resistance of resistor 57, preferably about 137 ohms.

In the absence of any termination, the voltage is pulled down to about $V_{ce}$ or about 0.8 volts. If there are extra terminations above that desired, the voltage on source 56 is above the desired 1.5 volts. For example, if there are two terminations, the measured voltage on source 56 is found from the above relation by replacing $R_{term}$ with $R_{term}/2$, so that with the above values the measured voltage is about 1.9 volts.

Thus, the state of the termination can be determined remotely by measuring the voltage of the source 52, in the presence of the load R57 and with the transistor 50 saturated.

This voltage measurement is preferably accomplished using the voltage divider and comparators discussed previously. The source 50 provides the high-end voltage to the voltage divider 84. The comparator 62 compares the voltage of the source 52 with the voltage $V_1$. The logic output 70, also sometimes referred to as TDHIGH, goes high if there are too many terminations or if the terminations are of too low an impedance. The comparator 64 compares the voltage of the source 52 with the voltage $V_2$. The logic output 76, also sometimes referred to as TDLOW, goes high if there is no termination or if the existing termination is of too high an impedance.

Thus, the voltage range between the voltages $V_1$ and $V_2$ defines a window of the proper conditions for the source 52 of the bus signal. If the source 52 is within the window, neither logic output 70 nor logic output 76 goes high. If either logic output 70 or 76 goes high, the terminator circuit 30 is not proper for some reason, and the reason can be determined from the identity of the logic output that goes high. The size of the window and its upper and lower limits are determined by the exact values chosen for the transistors 88, 90, and 92 (FIG. 3) or for the resistors 100, 102, and 104 (FIG. 4). In the illustrative case discussed above, the lower limit should be between 0.8 and 1.6 volts, and the upper limit should be between 1.6 and 2.0 volts. Experience with particular systems permits the values to be chosen exactly. In an operable embodiment of FIG. 4, the value of resistor 100 is 6200 ohms, the value of resistor 102 is 1900 ohms, and the value of resistor 104 is 2000 ohms.

The values of the logic outputs 70 and 76 are provided to the logic chip 94 over these lines. After a settling time, typically a few milliseconds, the values are latched into the register in the logic chip 34. The values of the logic outputs are available for monitoring by the computer CPU 32 or other device, numeral 120.

After the logic values of outputs 70 and 76 have been latched into the register of the logic chip 34, the source 50 of the detection signal is de-activated and the switchable near-end termination circuit 29 is de-activated, numeral 122, again connecting the logic chip 34 to the bus 22. There is no current drain on the bus due to the circuit 40 after de-activation is accomplished.

Based upon the logic outputs 70 and 76, a suitable warning can be signalled to the user in the event that the termination circuit is out of limits for any reason, numeral 124. A diagnostic message can be displayed for the user, with basic instructions derived from the identity of the logic output that indicates an out-of-limits status, for solving the problem. A signal to the user can also be provided in the event that there is no problem, but such a signal would ordinarily not be made because it would only serve to distract the user.

The circuit 40 then becomes idle pending its further use, as indicated by the break in the line following box 124 of FIG. 5. During this idle period, the state of the system is monitored, numeral 126, to detect a condition that requires a re-testing of the termination status. The criterion for re-testing is preselected and provided to the step of monitoring 126 for this purpose. A wide variety of re-testing criteria can be used, and the re-testing criterion is selected to be the most suitable for detecting bus termination problems when they occur without over-testing in situations where no bus termination problems are likely. In one possible approach, re-testing can be performed when a new device is added to the group of devices 24, 26, and 28. The addition of such a new device is indicated by periodic reading of the menu of devices available to the system or when a new device is addressed by the system 20. In another approach, the re-testing of the termination status can be performed as a routine matter whenever a system error is indicated. In yet another approach, the termination status can be retested whenever the bus becomes idle. The latter is not preferred, because of the processor time consumed in the testing of the termination status under conditions where no termination problem is likely. The re-testing criterion can be one of these approaches, another approach that might be suitable for a particular system, or a combination of these approaches. When the monitoring detects the satisfaction of the preselected criterion, the steps of testing (steps 112–122) and signalling (step 124) are repeated.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A system having a capability to determine the termination status of a bus therein, comprising:
    a source of a bus signal from a bus;
    a selectively activated current sink that communicates with the source of the bus signal, the current sink having a detection activation input;
    a source of a detection signal in communication with the detection activation input of the current sink;
    a source of a first reference voltage;
    a source of a second reference voltage, the second reference voltage being less than the first reference voltage;
    a high-termination comparator having an upper voltage input that communicates with the source of the bus signal, a lower voltage input that communicates with the source of the first reference voltage, and a logical high-termination output; and
    a low-termination comparator having a lower voltage input that communicates with the source of the bus signal, an upper voltage input that communicates with the source of the second reference voltage, and a logical low-termination output.

2. The system of claim 1, wherein the bus signal is a -BSY signal of a small computer system interface bus.

3. The system of claim 1, wherein the bus signal is a -RESET signal of a small computer system interface bus.

4. The system of claim 1, wherein the current sink comprises
    a pull-down resistor having a first end that communicates with the source of a bus signal; and
    a switch that selectively connects a second end of the pull-down resistor with ground.

5. The system of claim 4, wherein the pull-down resistor has a resistance of about 132 ohms.

6. The system of claim 4, wherein the switch comprises a transistor having a collector in communication with the second end of the pull-down resistor, an emitter communicating with ground, and a base communicating with the source of the detection signal.

7. The system of claim 1, wherein the source of a detection signal includes
    means for selectively activating the source of the detection signal when the bus is inactive.

8. The system of claim 1, further including
    means for selectively activating the source of the detection signal each time the system addresses a device that communicates with the bus.

9. The system of claim 1, wherein the source of the first reference voltage and the source of the second reference voltage each comprise an output of a voltage divider stack.

10. The system of claim 9, wherein the voltage divider stack comprises a stack of transistors.

11. The system of claim 9, wherein the voltage divider stack comprises a stack of resistors.

12. The system of claim 1, further including
    means for latching the high-termination output and the low-termination output.

13. The system of claim 1, wherein the bus comprises a bus internal to a computer.

14. The system of claim 13, wherein the bus is a small computer system interface bus.

15. A system having a capability to determine the termination status of a bus therein, comprising:
    a source of a bus signal from a bus;
    a pull-down resistor having a first end that communicates with the source of a bus signal;
    a switch that selectively connects a second end of the pull-down resistor with ground responsive to a switch input signal;
    a source of a detection signal in communication with the switch input signal;
    a voltage divider having a first output comprising a source of a first reference voltage and a second output comprising a source of a second reference voltage, the second reference voltage being less than the first reference voltage;
    a high-termination comparator having an upper voltage input that communicates with the source of the bus signal, a lower voltage input that communicates with the source of the first reference voltage, and a logical high-termination output; and
    a low-termination comparator having a lower voltage input that communicates with the source of the bus signal, an upper voltage input that communicates with the source of the second reference voltage, and a logical low-termination output.

16. A method for determining the termination status of a bus in a system, comprising the steps of:

providing a system having a bus and at least one device connected to the bus;

testing the termination status of the bus, the step of testing to occur without human intervention;

signalling the termination status of the bus in the event that the step of testing has a preselected result;

monitoring a state of the system to identify a condition for a re-testing of the termination status of the bus; and repeating the steps of testing and signalling, responsive to the step of monitoring.

17. The method of claim 16, wherein the step of testing includes the step of providing an apparatus comprising a selectively activated current sink that communicates with a source of a bus signal, the current sink having a detection activation input, a source of a detection signal in communication with the detection activation input of the current sink, a source of a first reference voltage, a source of a second reference voltage, the second reference voltage being less than the first reference voltage, a high-termination comparator having an upper voltage input that communicates with the source of the bus signal, a lower voltage input that communicates with the source of the first reference voltage, and a logical high-termination output, and a low-termination comparator having a lower voltage input that communicates with the source of the bus signal, an upper voltage input that communicates with the source of the second reference voltage, and a logical low-termination output, and wherein the step of testing includes the step of testing the logical high-termination output and the logical low-termination output for the presence of the preselected result.

18. The method of claim 17, wherein the step of testing includes the steps of disconnecting a near-end termination of the bus at a computer end of the bus;

activating the detection signal for a device communicating with the bus, when the bus is idle;

monitoring the logical high-termination output and the logical low-termination output; and de-activating the detection signal and reconnecting the near-end termination.

19. The method of claim 16, wherein the step of monitoring includes the step of determining an attempt to address a new device that communicates with the bus, and, if there is an attempt to address such a new device, causing entry to the step of repeating.

* * * * *